United States Patent [19]

Harris

[11] Patent Number: 4,734,922
[45] Date of Patent: Mar. 29, 1988

[54] NUCLEAR GAUGE TRAVERSE

[75] Inventor: Holton E. Harris, Westport, Conn.

[73] Assignee: Harrel, Inc., East Norwalk, Conn.

[21] Appl. No.: 943,658

[22] Filed: Dec. 18, 1986

[51] Int. Cl.$^4$ .................... G01B 15/02; G01N 23/16; B29C 35/08

[52] U.S. Cl. ................... 378/089; 250/360.1; 264/040.1; 378/055; 425/141

[58] Field of Search ............ 378/089, 058, 055; 250/560, 360.1, 359.1, 559; 425/141; 264/40.1

[56] References Cited

U.S. PATENT DOCUMENTS 3,307,215  3/1967  Gerhard et al. ............ 378/055
4,454,084  6/1984  Smith et al. ............... 425/141
4,542,297  9/1985  Hold ........................ 378/055

OTHER PUBLICATIONS

Harrel, Inc.'s Technical Data Sheet, TDS-250 entitled "TG-600 Series Nuclear Thickness Gauges".
Harrel, Inc.'s Technical Data Sheet, TDS-254 entitled "CP-680 Digipanel System".
Harrel, Inc.'s Technical Data Sheet, TDS-245B entitled "SC-600 Series Digipanel Sheet Thickness Controller".
Holton E. Harris' article "Computerized Control of Sheet Thickness Makes Extrusion More Profitable," Plastics Design and Processing, Feb. 1975.

Primary Examiner—Craig E. Church
Assistant Examiner—T. N. Grigsby
Attorney, Agent, or Firm—Brumbaugh, Graves, Donohue & Raymond

[57] ABSTRACT

A thickness gauge traverse for a gauge such as a nuclear thickness gauge that measures thickness of extruded sheet at numerous locations across the sheet in a system utilizing those measurements to correct thickness of the extrusion. The traverse has a mount supporting the probe of the gauge for movement across the sheet. A motor and motor control electronics rapidly advance the probe from one measurement point to the next, where the mount is stopped permitting the probe to remain for the considerable time necessary to make its measurement without having that time dominate the speed of the gauge's movement from point to point across the sheet.

1 Claim, 3 Drawing Figures

NUCLEAR GAUGE TRAVERSE

BACKGROUND OF THE INVENTION

This invention relates to an improvement in a traverse for a thickness gauge and more particularly to a nuclear gauge traverse drive that rapidly moves the gauge from measurement point to measurement point where the gauge resides for the considerable time necessary to measure thickness. Reducing the time that a traverse takes to make a single pass across continuously moving product being manufactured will improve system response time by enabling quicker response to tolerance departures in the measured parameter or trends toward out of spec product and hence improve the performance of any closed loop control used with the traverse.

An extruder makes plastic sheet by heating plastic in the manner well-known in the art and forcing it through a die that is in the form of a narrow slit. The thickness of the sheet at each point is determined by a number of factors such as the temperature of the die lips, the viscosity of the plastic at that point, surface finish on the die lips, etc., but it is also determined in large part by the spacing between the die lips at the point in question.

To have the thickness of the sheet as uniform as possible across the width is important in extruding sheet, otherwise subsequent use of that sheet will have highly variable results. No die can be made absolutely perfect, and to allow some means for adjusting the die opening at the various points across the width, it is customary to build slight flexibility into one of the lips and mount a series of bolts across the width so that the die lips may be flexed slightly to increase or decrease spacing between the lips at that point. Typical spacing of these die bolts along the width (i.e. the direction transverse to the direction of movement of the extruded product) is 1 ⅜". There may be 67 die bolts across the width of a 75" die. Thirty inch (30") wide dies have 26 die bolts.

Nuclear thickness gauges are used to monitor the thickness of extruded sheet. To measure the thickness profile accurately across the width of the sheet, the gauge is mounted on a traverse that carries the gauge across the sheet. A monitoring device such as the Harrel CP-680 DIGIPANEL sheet thickness controller used with the gauge notes the thickness reading as the gauge passes points across the sheet width corresponding to each die bolt position and creates a profile display that is a histogram or bar chart of thickness in each die bolt position.

In a manually adjusted system the operator notes where the sheet thickness deviates from the norm and adjusts the appropriate bolt or bolts manually to eliminate the discrepancy. Harrel, Incorporated, the assignee of this invention, makes two types of automatic control systems which can adjust the thickness profile automatically. One uses the "AUTO-FLEX" die system available from Extrusion Dies, Incorporated. This die system uses die bolts made from a metal having a high co-efficient of thermal expansion. Changing the heat applied to the bolt by a heater wrapped around such a die bolt makes it possible to adjust the die lip spacing by remote control.

The second system, developed by the assignee Harrel, uses heaters along the die lips. The temperature of the die lip at each point also affects the amount of plastic which comes through at that given point, and hence the thickness at that point. A modern digital controller such as the Harrel CP-680 DIGIPANEL system can, by dictating the current to each heater, change the lip temperature at each heater location and accomplish the same result as if the spacing of the die lips had been changed. Here it is the location of the heaters that is of interest in measuring thickness at points across the sheet width. Sheet thickness should be measured at locations corresponding to the heaters. In any case, one is interested in 60 or so discrete locations in a 90" wide die, for example.

A thickness gauge that is used for thickness measurements of the type described is known as a gamma backscatter gauge. The Harrel TG-600 nuclear is such a gauge. This gauge requires an appreciable time to reach equilibrium. Time constants of 1 and 3 seconds are common. They might range as widely as 0.5 to 10 seconds. A time constant of 1 second, for example, means that if the plastic is thicker opposite a particular die bolt, one has to stay in the vicinity of the measurement point corresponding to that die bolt for at least 3 seconds to measure 99% of the discrepancy. This requirement sets the ultimate limit on how fast one can afford to run a traverse, which operates at constant speed. The gauge cannot go from one measurement point to the next in less than 5 seconds or so. With 60 bolts this means that the gauge only makes one scan and measures one thickness profile in about 300 seconds or 5 minutes, and even this is a compromise. Even the use of a constant speed traverse in a faster than ordinary case, say a gauge travelling slowly enough to be in proximity to each measurement point for just one time constant of 0.5 seconds will, when used with 20 or more measurement points result in a very slow source of control information by the standards of closed loop controls. Even that control would benefit appreciably from the connection described herein.

BRIEF SUMMARY OF THE INVENTION

In accordance with this invention, in a thickness measurement system for an extruder that utilizes a gauge with an appreciable time requirement for thickness measurement at a point, the gauge drive rapidly accelerates the gauge on the traverse after measurement, moving the gauge at a higher velocity to the next point of measurement, then rapidly decelerates the gauge and measures while stopped, repeating this process as the gauge completes its traverse of the extruded product. A motor drive controlled from the digital controller that effects thickness modifications based upon the gauge measurement, can speedily move the gauge between stopping points corresponding to thickness-altering die bolts or heaters so that the gauge's time constant does not dominate the traverse time. The controller can locate the measurement points at which the gauge stops, and can determine the time period for which the gauge is stopped. A reversible stepping motor operable from the controller output is one available drive suitable for this purpose. Another is a reversible DC motor driven by a servoamplifer having an analog input supplied by a digital to analog converter connected to the digital output of the controller. A feedback loop can be completed utilizing a potentiometer to indicate the gauge's location.

Transverse scanning or movement in the case of a sheet extruder means movement of the gauge across the width of the scanned sheet. The invention can be employed with tubular extrusions, in which case transverse movement of the gauge means movement about the extruded tube along a circular path. It will also be appreciated that the invention is useful with respect to blown film, wherein the gauge moves about the outer surface of the inflated tube of extruded film.

Typically with an extruded film in excess of 80" wide more than 50 points can be measured for thickness. The gauge, having a measurement time constant in the range 0.5 to 3.5 seconds will stop in excess of 2 seconds at each point, but with the present invention will move at top speed to the next point in well less than 2 seconds, covering a typical distance of 1" to 2" between points. Because it is desirable to run the drive at maximum speed and then slew to an immediate, dead stop without coasting, dynamic braking, a regenerative reversible drive, or a reversible stepping motor should be used for driving the gauge on the traverse.

BRIEF DESCRIPTION OF THE DRAWINGS

The above and further objects and advantages of the invention will be better understood from the following detailed description of a preferred embodiment taken in consideration with the accompanying drawings, in which.

DETAILED DESCRIPTION OF PREFERRED EMBODIMENT

Figures 1, 2:
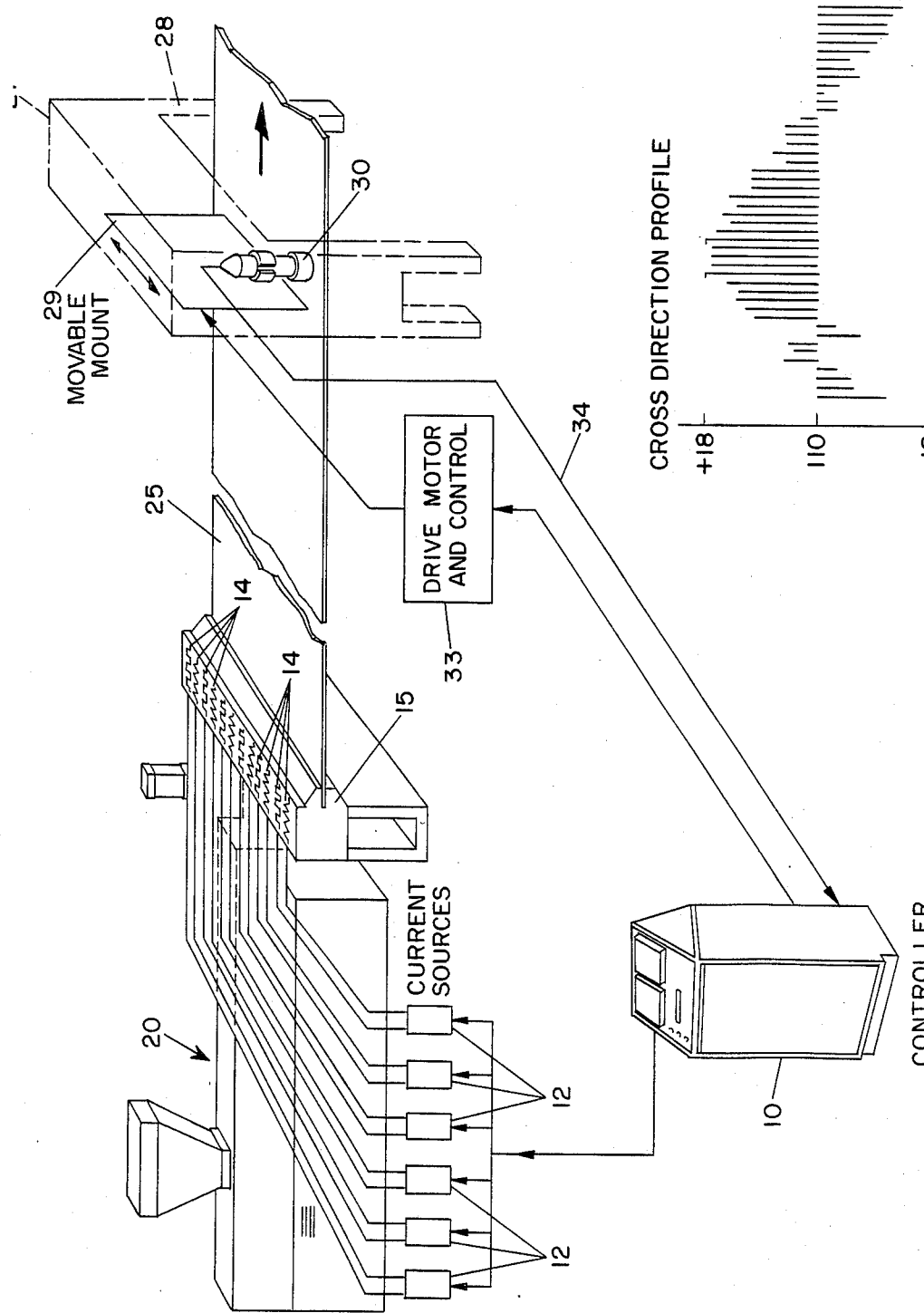
FIG. 1 is a diagramatic illustration of an extruder thickness control system and shows a digital controller for effecting rapid traversing of a gauge across an extruded sheet.
FIG. 2 is an exemplary display graphically illustrating a cross direction profile available from the controller of FIG. 1.
Figure 3:
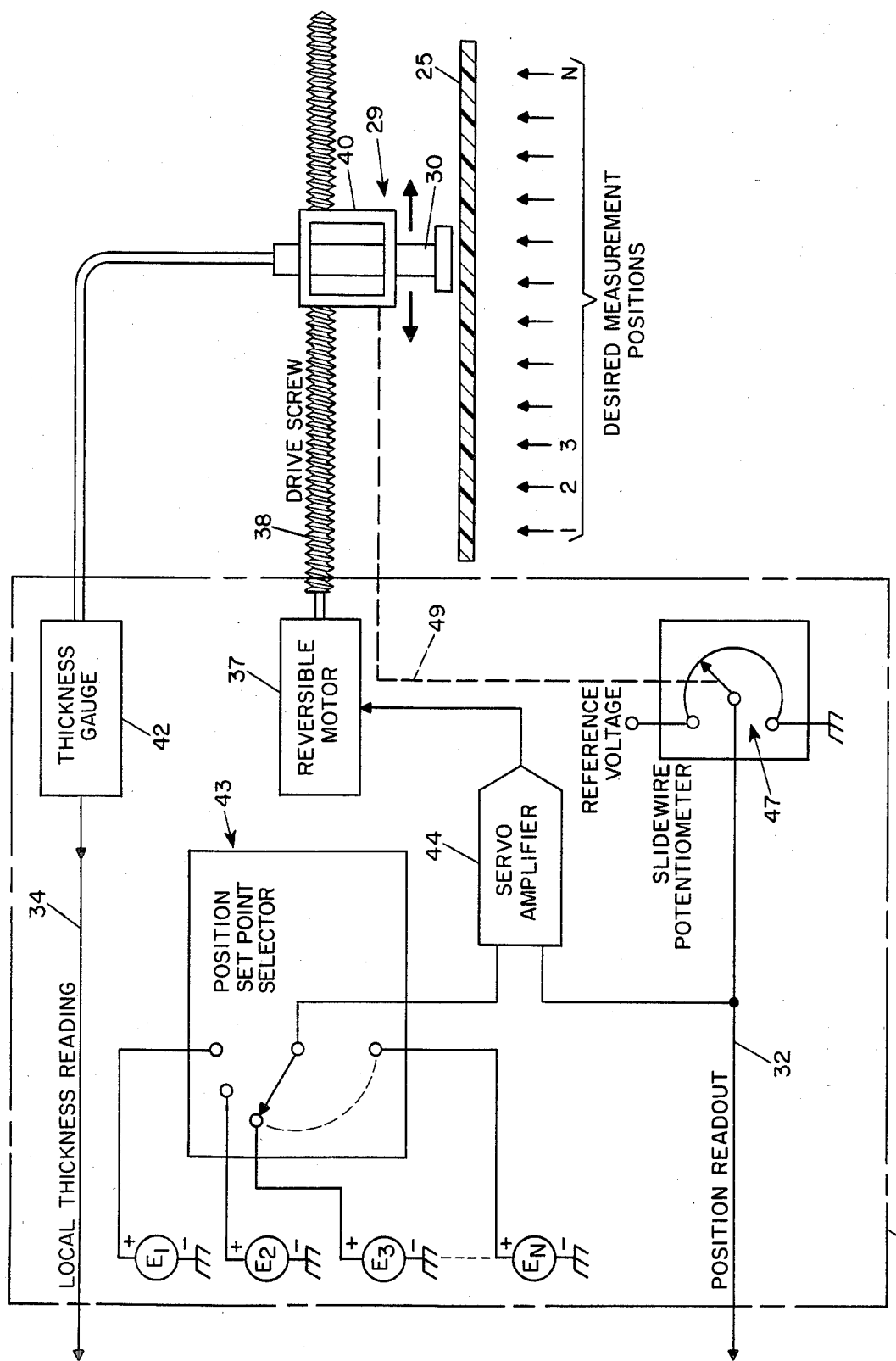
FIG. 3 is diagramatic illustration of just one means of accomplishing probe movement in accordance with the invention and shows a reversible motor and controls for effecting rapid movement between points of measurement via a screw-driven probe mount carriage.

In FIG. 1 a digital controller 10, (for example a Harrel DIGIPANEL sheet thickness controller of the SC-600 series) is connected in controlling relation to a series of current sources or contactors 12 that supply current to heaters 14 at the die 15 of an extruder 20. An extruded sheet 25 passes a traverse 27. The traverse comprises a stand 28 and a moveable gauge mount 29 supported for transverse movement across the sheet 25. The gauge mount 29 supports a nuclear gauge 30, for example, a gauge of the gamma backscatter type like the Harrel TG601 or TG602 thickness gauges. The traverse 27 can be a traverse of the kind offered by Harrel, Incorporated under the designation TM 600. The mount 29 is mechanically driven by the motor of a motor and control combination 33. An output 32 from the motor and controller 33 provides a gauge position indication to the controller 10. A gauge output 34 supplies a thickness indication to the controller. The drive motor 33 can be a reversible motor 37, as shown in FIG. 3. The digital controller 10 is microprocessor based, and is thus programmable with memory. The output 34 from the gauge is delivered to the controller 10 which then compares measured thickness with stored, preset desired thickness and adjusts the relevant heater 14 accordingly. In the die 15 of the extruder 20, it is heat delivered to the die lips that effects changes in thickness through viscosity alterations at the particular location, but it will be understood that the similar delivery of heat to bolts along the die of a known, heated bolt die thickness control system will operate in like manner.

In FIG. 3 the motor control and carriage drive is shown in greater detail. The reversible motor 37 is shown coupled to a drive screw 38, spanning the extruded sheet 25 and in driving relation to a carriage 40 forming a part of the moveable mount 29 of FIG. 1. The carriage supports the nuclear probe 30 above the extruded sheet. The thickness gauge and its electronics 42, which are known commercial products, provide their output 34 to the controller 10 as shown in FIG. 1.

Test points along the width of the sheet 25 are established by a series of voltages $E_1$, $E_2$, $E_3$ ---- $E_N$ illustrated schematically as discrete sources in cooperation with switching means 43 in FIG. 3, but which, it will be realized, can be accomplished by a digital to analog converter suitably programmed by, e.g. a microprocessor to deliver $E_1$, $E_2$, etc. These test point-establishing voltages are fed as one input to a servoamplifier 44. A slide wire potentiometer 47 develops an analog signal representative of the actual position of the probe through a mechanical coupling 49 of that potentiometer to the carriage 40 or to the drive screw 38. The position-representative voltage from the potentiometer is the position signal provided to the controller 10 in FIG. 1. This voltage also serves as a second input to the servoamplifier 44 to control the motor 37, such that the amplifier 44 output to the motor 37 comes to zero and the motor stops each time the potentiometer output equals a predetermined one of the voltages $E_1$, $E_2$, etc. The motor 37 and its servoamplifier can be known, available products affording the regenerative reversible drive suitable to produce sudden, accurate stopping at the preselected location.

FIG. 2 is an actual transverse profile developed using a gauge 30 in cooperation with a controller 10 and illustrates the information that the gauge provides. Deviation from the chosen thickness, shown as 110 on the Y axis, is plotted at points corresponding to more than 60 die locations across the sheet, represented along the X axis. Utilizing this information to supply the necessary heat to the heaters 14 will, it can be seen, provide accurate thickness control on a continuing basis. Rapidly accelerating the moveable mount 29 to its maximum speed via the drive motor means 33 between measuring points significantly enhances this control. This is of particular value today when extruder speeds are constantly being increased for higher production capacity and slowness to respond to out of spec operation can produce excessive waste.

It will be recognized that utilizing a known rotary scanning mount, for example the Harrel RM-200, in the above-described technique can be employed for pipe or tube extrusions by rapidly accelerating the gauge about the tubular product to preselected measurement points corresponding to die adjustment points of the tubular die. Similarly, movement of the gauge with respect to the bubble where blown film is produced permits use of the invention in this setting, as well.

As mentioned above, the drive motor 33 need not be the reversible servomotor shown, but can be a suitably controlled stepper motor. In which case controlling electronics would simply put out the number of motor drive pulses to advance the stepper motor to each measurement point. In an open loop system the pulses are counted until the correct position is reached, at which time a measurement is effected. In a closed loop system a digital position encoder senses the position and puts out enough pulses until the signal from the encoder matches the one corresponding to the desired position. Any of the above accomplishes the result of greatly speeding the measuring process over the transverse direction of the product. Rather than the drive screw the carriage 40 can be driven by a known chain or cable drive.

It can be seen that no longer allowing the time constant of a nuclear gauge to dominate the speed of tracking of a traverse-mounted gauge greatly enhances the speed with which important thickness adjustments can be made in an extrusion line. Whereas specific preferred features of a preferred embodiment have been described above, it will be recognized by those skilled in the art that other modifications and alterations can be made without departure from the spirit and scope of the invention, which invention is described in the appended claims.

I claim:

1. In an extruded sheeet thickness monitoring and correction system a sheet extension die having a plurality of electrically controllable sheet thickness altering means at spaced locations across the width of the die, a nuclear thickness gauge having a measurement time constant in the range 0.5 to 10 sec., a traverse including means for mounting the gauge for movement transversely across the sheet, motor means electrically controllable for rapid starting and stopping and being connected in driving relation to the gauge mounting means, for moving the gauge on the traverse across the sheet, the improvement comprising electrical motor control means for (a) stopping the gauge at multiple measurement points across the width of the sheet, (b) maintaining the gauge stopped at each of the measurement points for a period at least as long as the time constant of the gauge, and (c) moving the gauge quickly between measurement points, an extruder controller means connected with a gauge output and with the electrical motor control means for determining thickness at said multiple measurement points, said extruder controller means being connected in control relation with the plurality of electrically controllable sheet thickness altering means to alter thickness at the locations of particular measurement points in response to departures from predetermined thicknesses thereat, such that, by rapid movement between measurement points, the time of the gauge totally traversing the sheet width is substantially reduced below the time necessary to move the gauge at a constant speed across the sheet, enabling more rapidly occurring thickness measurements at the measurement points and quicker correction of the thickness profile across the sheet commensurately, said die having a width of at least 10 inches, and at least 20 sheet thickness altering means, and the system having at least 20 corresponding measurement points across the width of the extruded sheet, the gauge stopping time at each of the measurement points being at least 0.5 seconds and the gauge movement time between measurement points being less than two seconds.

* * * * *